United States Patent [19]

Delimoy et al.

[11] Patent Number: 5,230,935
[45] Date of Patent: Jul. 27, 1993

[54] MULTILAYER COMPOSITES COEXTRUDED WITH THE USE OF IMPACT-REINFORCED IMPERVIOUS RESIN COMPOSITIONS AND THEIR USE FOR THE MANUFACTURE OF FUEL STORAGE VESSELS

[75] Inventors: Didier Delimoy, Chaumont-Gistoux, Belgium; Pierre De Longree, Caerphilly, Great Britain

[73] Assignee: Solvay & Cie (Société Anonyme), Brussels, Belgium

[21] Appl. No.: 982,420

[22] Filed: Nov. 27, 1992

Related U.S. Application Data

[63] Continuation of Ser. No. 717,845, Jun. 21, 1991, abandoned.

[30] Foreign Application Priority Data

Jun. 22, 1990 [BE] Belgium .............................. 09000644

[51] Int. Cl.⁵ ...................... B29D 22/00; B29D 23/00; B32B 27/08; C08L 29/04
[52] U.S. Cl. .................................. 428/36.7; 428/516; 428/520; 428/2; 264/176.1; 525/57; 525/74
[58] Field of Search ........................ 428/36.7, 516, 520

[56] References Cited

U.S. PATENT DOCUMENTS

| 4,409,364 | 10/1983 | Schmukler et al. | 525/74 |
| 4,477,532 | 10/1984 | Schmukler et al. | 428/508 |
| 4,600,746 | 7/1986 | Schmukler | 525/57 |

FOREIGN PATENT DOCUMENTS

55-155042 12/1980 Japan.

*Primary Examiner*—P. C. Sluby
*Attorney, Agent, or Firm*—Spencer, Frank & Schneider

[57] ABSTRACT

Multilayer composites coextruded with the use of polyolefins and of impact-reinforced impervious resin compositions based on hydrolysed copolymers of vinyl acetate and ethylene comprising, as an additive improving the impact strength, elastomeric copolymers of ethylene and propylene which are modified by grafting an $\alpha,\beta$-ethylenically unsaturated carboxylic acid and, preferably, by maleic anhydride.

The coextruded multilayer composites are very particularly suitable for the manufacture of fuel storage vessels combining impact strength and high imperviousness to petrol and to petrol/alcohol mixtures.

10 Claims, No Drawings

MULTILAYER COMPOSITES COEXTRUDED WITH THE USE OF IMPACT-REINFORCED IMPERVIOUS RESIN COMPOSITIONS AND THEIR USE FOR THE MANUFACTURE OF FUEL STORAGE VESSELS

This application is a continuation of application Ser. No. 07/717,845, filed Jun. 21, 1991, now abandoned.

The present invention relates to multilayer composites coextruded with the use of impact-reinforced impervious resin compositions and to their use for the manufacture of fuel storage vessels. It relates more particularly to multilayer composites coextruded with the use of polyolefins and of impact-reinforced impervious resin compositions based on hydrolysed copolymers of vinyl acetate and ethylene, and to the use of such composites for the manufacture of fuel storage vessels.

Hydrolysed copolymers of vinyl acetate an ethylene, commonly called EVOH copolymers, form thermoplastic copolymers of semicrystalline structure which can be coextruded with polyolefins and which are characterised essentially by their very good imperviousness to gases and to dry aromas. Multilayer composites within which layers based on polyolefins such as polyethylene or polypropylene are sued in combination with a layer of EVOH copolymer already find many applications in the packaging field, for example for packaging food and medicinal products. Nevertheless, such multilayer composites based on polyolefins and EVOH copolymers cannot be employed for applications which are demanding from the viewpoint of impact strength, such as, for example, the packaging of toxic or volatile products.

The present invention is aimed at providing multilayer composites coextruded with the use of polyolefins and of impervious resin compositions based on hydrolysed copolymers of vinyl acetate and ethylene, which simultaneously exhibit an imperviousness and an impact strength both of which are high, and the use of such composites for the manufacture of fuel storage vessels.

To this end, the invention provides multilayer composites coextruded with the use of polyolefins and impact-reinforced impervious resin composition based on hydrolysed copolymers of vinyl acetate and ethylene comprising, as an additive improving the impact strength, elastomeric copolymers of ethylene and propylene which are modified by grafting and $\alpha,\beta$-ethylenically unsaturated carboxylic acid.

Elastomeric copolymers of ethylene and propylene ("EPR copolymers") which can be employed for grafting with an $\alpha,\beta$-ethylenically unsaturated carboxylic acid generally comprise at least 40% and not more than 95 mol % of ethylene-derived monomer units, the remainder consisting of propylene-derived monomer units. They preferably comprise from 45 to 85 mol % of ethylene-derived monomer units and from 55 to 15 mol % of propylene-derived monomer units.

An $\alpha,\beta$-ethylenically unsaturated carboxylic acid is intended, for the purposes of the present invention, to denote $\alpha,\beta$-ethylenically unsaturated monocarboxylic or dicarboxylic acids and their anhydrides and their mixtures such as, for example, acrylic acid, methacrylic acid, maleic acid, fumaric acid, maleic anhydride and their mixtures. Preference is given to EPR copolymers grafted with maleic anhydride.

EPR copolymer modified with an $\alpha,\beta$-ethylenically unsaturated carboxylic acid ("modified EPR copolymers") are obtained, in a known manner, by reacting EPR copolymers in the melt or in solution with an $\alpha,\beta$-ethylenically unsaturated carboxylic acid in the presence of a peroxide. Modified EPR copolymers which have a given content of grafts derived form an $\alpha,\beta$-ethylenically unsaturated carboxylic acid can be obtained either directly by grafting small quantities of $\alpha,\beta$-ethylenically unsaturated carboxylic acid or by dilution of an EPR copolymer modified with large quantities of $\alpha,\beta$-ethylenically unsaturated carboxylic acid with unmodified EPR copolymer. In this latter case, modified EPR copolymers are intended to means the mixtures of unmodified EPR copolymer and modified EPR copolymer.

The weight content, in modified EPR copolymers, of monomer units derived from and $\alpha,\beta$-ethylenically unsaturated carboxylic acid as defined above is, in general, between 0.1 and 1.5% by weight and, preferably, between 0.6 and 1.2% by weight.

The modified EPR copolymers which can be employed according to the present invention therefore generally comprise from 40 to 95 mol % of ethylene-derived monomer units, from 60 to 5 mol % of propylene-derived monomer units and from 0.1 to 1.5% by weight of monomer units derived from an $\alpha,\beta$-ethylenically unsaturated carboxylic acid. Preference is given more particularly to the modified EPR copolymers comprising from 45 to 85 mol % of ethylene-derived monomer units, from 55 to 15 mol % of propylene-derived monomer units and from 0.6 to 1.2% by weight of monomer units derived from and $\alpha,\beta$-ethylenically unsaturated carboxylic acid.

The modified EPR copolymer content of the compositions based on impact-reinforced impervious resin ("impact-reinforced EVOH copolymer") is not particularly critical. The incorporation of small quantities of modified EPR copolymer, of the order of a few percent by weight, already makes it possible to improve the impact strength of object which are manufactured by coextrusion. Beyond approximately 35% by weight, there is no further significant gain in impact strength. The impact-reinforced EVOH copolymers used according to the invention therefore generally comprise approximately from 5 to 35% by weight of modified EPR copolymer and, preferably, from 15 to 25% by weight.

A surprising effect of the present invention lies in the fact that the incorporation of modified EPR copolymers in the abovementioned proportions does not result in a significant modification in the imperviousness of the EVOH copolymers to gases and to dry aromas.

Another surprising aspect of the present invention lies in the high imperviousness of the coextruded multilayer composites according to the invention to pure petrol and to petrol-alcohol mixtures, which is, furthermore, very considerably superior to that of similar multilayer composites in whcih the barrier resin is a polyamide.

A hydrolysed copolymer of vinyl acetate and ethylene (EVOH copolymer) is intended, for the purposes of the present invention, to denote hydrolysed copolymers of vinyl acetate and ethylene containing from 20 to 60 mol % and, preferably, from 25 to 50 mol % of ethylene-derived monomer units and which have a degree of hydrolysis of at least 96% and, preferably, of at least 98%.

The impact-reinforced impervious resin compositions are advantageously manufactured by mixing all the ingredients in the melt in an extruder with, if appropriate, a dry-preblending stage.

The polyolefins which can be employed for producing the coextruded multilayer composites according to the invention include, in particular, polyethylene and more particularly high density polyethylene, as well as polypropylene.

In addition to the layer of impact-reinforced EVOH copolymer and one or more polyolefin layers, the multilayer composites according to the invention generally include one or more layers of polymeric adhesive intended to bond together the polyolefin and reinforced EVOH copolymer layers. To do this, polymeric adhesives which are usually recommended for bonding polyolefins to EVOH copolymer are employed, such as the extrudable adhesives obtained by copolymerising or grafting polar molecules onto nonpolar macromolecular chains. By way of nonlimiting examples of such polymeric adhesives there may be mentioned copolymers of ethylene and acrylic acid or else polyolefins, polyethylene or polypropylene, modified by grafting maleic anhydride, preference being given to the polyolefins grafted with maleic anhydride.

It is understood that each of the constituent polymers of the coextruded multilayer composites may comprise the usual additives employed in processing this polymer such as, for example, heat stabilisers, lubricants, pigments, and the like.

The expression "coextruded multilayer composite" includes the blow-coextruded multilayer composites obtained by blowing a coextruded parison.

The usual techniques of coextrusion and of blow-coextrusion through a die, which is flat or round, with a feed block or multimanifold, may be resorted to for producing the coextruded multilayer composites according to the invention. These techniques are characterised by the fact that the streams of molten polymers forming the various layers combine together and travel together in the molten state before the single die exit. The multilayer composites according to the invention can therefore take the form of sheets, plaques, tubes, preforms or hollow bodies, and the like.

The thickness of the polymeric layers forming the multilayer composites according to the invention and the total thickness of the said structures are not critical and depend, of course, on the use for which they are intended and the degrees of imperviousness and of impact strength which are required. To give an idea, the total thickness of the multilayer composites is generally between 0.5 and 7 mm, the polyolefin layer(s) having thicknesses which may vary between 0.2 and 6.5 mm. The thickness of the barrier layer is generally between 50 and 250 microns and that of the adhesive polymer layers between 10 and 150 microns.

The multilayer composites according to the invention therefore generally comprise at least three layers consisting of one outer polyolefin layer, an intermediate polymeric adhesive layer and an outer layer consisting of an impact-reinforced impervious resin composition (impact-reinforced EVOH copolymer). Preferred three-layer coextruded composites comprise three layers consisting of an outer layer of high density polyethylene, an intermediate layer of polymeric adhesive and an outer layer consisting of an impact-reinforced impervious resin composition (impact-reinforced EVOH copolymer). Such composites can be employed, for example, for the manufacture of flasks intended for packaging plant-protection products, in whcih the impact-reinforced impervious resin layer forms the inner layer. Other preferred three-layer coextruded composites comprise three layers consisting of an outer layer of polypropylene, an intermediate layer of polymeric adhesive and an outer layer consisting of an impact-reinforced impervious resin composition (impact-reinforced EVOH copolymer). Such composites can be employed, for example, for the manufacture of floor-heating tubes in whcih the impact-reinforced impervious resin layer forms the outer layer.

In the case where the impact-reinforced EVOH copolymer cannot form an outer layer as a result, for example, of its sensitivity to moisture or to some acids or oxidising agents, the multilayer composites according to the invention generally comprise five layers consisting essentially of two polyolefin outer layers which can, if appropriate, contain recycled waste, an inner layer consisting of an impact-reinforced impervious resin composition (impact-reinforced EVOH copolymer) and of two intermediate layers of polymeric adhesive. Recycled waste can, if appropriate, form one or more separate layer(s) situated between a polyolefin layer and a polymeric adhesive layer. In this case, the multilayer composites may comprise six layers or more.

Coextruded multilayer composites which are particularly preferred according to the present invention comprise essentially two outer layers of polyolefin and, more particularly still, of high density polyethylene, an inner layer consisting of an impact-reinforced impervious resin composition (impact-reinforced EVOH copolymer) and two intermediate layers of polymeric adhesive. Such composites are very particularly suitable for the blow-coextrusion of hollow bodies intended for fuel storage.

The use of coextruded multilayer composites of this type comprising essentially two outer layers of high density polyethylene, an inner layer consisting of an impact-reinforced impervious resin composition (EVOH according to the invention (impact-reinforced EVOH copolymer) and two intermediate layers of polymeric adhesive for the manufacture of fuel storage vessels, such as jerrycans and motor vehicle fuel tanks, forms another aspect of the present invention.

The examples which follow are intended to illustrate the multilayer composites according to the invention. The polymers used in the examples below have the following characteristics:

hydrolysed copolymer of vinyl acetate and ethylene (EVOH): molar ethylene content: 32±2%; molar degree of hydrolysis: >99.5%; melt index: 1.3 g/10 min at 190° C. under a 2160 g load;

elastomeric copolymer of ethylene and propylene grafted with maleic anhydride (modified EPR); molar content of ethylene-derived monomer units: approximately 83%; molar content of propylene-derived monomer units: approximately 17%; weight content of monomer units derived from maleic anhydride: 0.7%; melt index 8.5 g/10 min at 230° C. under a 10 kg load;

polyamide 12 (PA 12): polyamide 12 marketed by Chemische Werke Huels under the trademark Vestamid L 2140 which has a melt index of 35 ml/10 min measured according to ISO Standard 1133;

impact-reinforced polyamide 6 (PA 6 RF): impact-reinforced polyamide 6 marketed by BASF under the trademark Ultramid KR 4430, whose viscosity at 240° C. and 100 $S^{-1}$ is 1300 Pa s;

high density polyethylene (HDPE): high density polyethylene marketed by Solvay and Co under the trademark Eltex B 5920; melt index: 0.44–0.50 g/10 min at 190° C. under a 5 kg load;

polymeric adhesive (Adhesive): polyethylene modified by grafting maleic anhydride, marketed under the trademark Admer L 2100 by Mitsui Petrochemical Ind.: melt index: 1.2 g/min at 190 ° C. according to ASTM Standard D 1238.

Example 1 relates to a composition containing 80% by weight of EVOH copolymer and 20% by weight of modified EPR copolymer.

Example 2, for comparison, relates to a composition consisting of 100% of EVOH copolymer.

Example 3, for comparison, relates to a composition consisting of 100% of polyamide 12 (PA 12).

Example 4, for comparison, relates to a composition consisting of 100% of impact-reinforced polyamide 6 (PA 6 RF).

The mixture of EVOH copolymer and of modified EPR copolymer used in Example 1 is manufactured in an extruder with twin interpenetrating corotative screws, the die temperature being between 200° and 220° C., and is then granulated. The other barrier polymers evaluated by way of comparison are int eh form of granules.

1. Evaluation of the impact strength of the compositions

By starting with the mixture according to Example 1 and with the barrier polymers according to the comparative example 2 to 4, 12.7×63.5×3.2 mm (1×L×h) bars were injection-moulded under the conditions specified below, on which the impact strength was measured on a notched specimen at 23° C. and at −40° C. according to ISO Standard 180/4A.

Injection-moulding conditions:

| injection pressure: | 1500 bars |
|---|---|
| holding pressure: | 1000 bars |
| injection speed: | 50 mm/s |
| mould temperature: | 35° C. |
| stock temperature: | Example 1: 235° C. |
| | Example 2: 225° C. |
| | Example 3: 230° C. |
| | Example 4: 260° C. |

The results of the measurement are shown in Table 1, appended.

From the comparison of these results it appears that the mixture of EVOH and modified EPR copolymers containing 20% by weight of modified EPR copolymer (Example 1) exhibits an impact strength which is, both at 23° C. and at −41° C., greatly superior to that of an EVOH copolymer (comparative Example 2) or of a polyamide 12 (comparative Example 3) when these are employed by themselves and, furthermore, of the same order of magnitude as that of an impact-reinforced polyamide 6 (comparative Example 4).

2. Evaluation of the imperviousness of the compositions to fuels

In this series of tests an evaluation was made of the imperviousness of the compositions according to Examples 1, 2 and 4 to standard pure petrol (according to the EEC Standard 34) and to a 90/10 volume mixture of standard petrol/methanol.

The measurement cell employed for this purpose consists of a metal side flange with a working height of 55 mm to which are attached tow square sheets, injection-moulded from the compositions according to Examples 1, 2 and 4, with a thickness of 1.2 mm and a 120 mm side. The sheet injection moulding conditions were as follows:

| injection pressure: | 1600 bars |
|---|---|
| holding pressure: | 1400 bars |
| injection speed: | 80 mm/s |
| mould temperature: | 35° C. |
| stock temperature: | Example 1: 245° C. |
| | Example 2: 220° C. |
| | Example 4: 260° C. |

These sheets are mounted so that the surface of the sheets exposed to the fuels is 90×90 mm$^2$. One the cell has been filled with the fuel to be tested (fuel volume: 400 ml) and the sheets have been sealed, the cell is placed in an enclosure controlled at 40° C.

After a period for attaining steady conditions, whose length depends on the material to be tested, it is found that the values of the daily lose in weight of the cell (expressed in mg/day) become uniform. As soon as the steady conditions are reached the loss in wight of the cell is measured at regular intervals and plotted on a diagram in mg (ordinate) as a function of the time in days (abscissa). The angular coefficient of the straight line obtained by linear regression on the experimental points yields a measurement of the imperviousness (daily loss in weight, expressed in mg, of the cell for a total exposed surface area of 16,200 mm$^2$ and a thickness of 1.2 mm).

Table 2, appended, gives the average values for 3 measurements of the imperviousness of the compositions according to Example 1 and the comparative Example 2 and 4.

Comparison of the results shows the superiority of the composition according to example 1 from the standpoint of imperviousness to petrol/methanol mixtures when compared with an impact-reinforced polyamide.

3. Evaluation of the imperviousness of extruded multilayer composites to fuels

In this series of tests and evaluation was made of the imperviousness to standard petrol (according to EEC Standard 34) and to a 90.10 (by volume) mixture of standard petrol/methanol of multilayer flasks 1 liter in capacity and weighing, on average, 130 g (known as plant-protection type), manufactured on a blow-coextrusion machine. The flasks evaluated, with five layers of symmetrically structure, have two outer HDPE layers, a middle layer of barrier resin according to Example 1, 2 or 3, and intermediate adhesive layers of adhesive polymer (definitions: cf. above).

The die temperature of the various constituent polymers of the blow-coextruded five-layer flasks were as follows:

HDPE: 220° C. (Examples 1, 2 and 3)
Polymeric adhesive: 185° C. (Examples 1, 2 and 3)
EVOH/modified EPR mixture: 220° C. (Example 1, according to the invention)
EVOH: 175° C. (Example 2, comparative)
PA 12: 220° C. (Example 3, comparative)

The average value (8 measurements) of the thickness of the layers of the blow-coextruded multilayer flasks evaluated below was:

outer HDPE layer: 1030 microns±40 microns opposite outer HDPE layer: 570 microns±35 microns adhesive layers: 40 microns±5 microns barrier resin layers: 105 microns±5 microns Five blow-coextruded flasks were manufactured from each of the compositions according to Examples 1, 2 and 3. By way of comparison, five one-layer HDPE flasks of the same capacity were also manufactured, whose wall thickness was 1800 microns±5 microns, that is to say with a total thickness identical to that of the walls of the multilayer flasks (Example 5, comparative).

Each of these flasks was filled with the fuel to be tested and conditioned at 40° C. Evaluation of the impermeability of the flasks was carried out in identical manner to that of the one-layer sheets, namely by weighting (with an accuracy of 1 mg) the flasks as a function of time and, as soon as the daily loss in weight became uniform recording experimental points enabling the angular coefficient of the straight line to be evaluated. Table 3, appended, gives the results of the evaluation of the imperviousness (average of five measurements) of the flasks, expressed in mg/day (daily loss in weight of the flasks, expressed in mg).

Comparison of the results shows the very substantial gain in imperviousness to pure petrol and to petrol/alcohol mixtures which is provided by the multilayer composites according to the invention (Example 1) when compared with multilayer composites based on polyamide 12 (Example 3, comparative), whose imperviousness to petrol/alcohol mixtures is barely higher than that of one-layer HDPE flasks of the same total thickness (example 5, comparative).

TABLE 1

| Example no. | Impact strength: J/m (ISO Standard 180/4A) | |
|---|---|---|
| | at 23° C. | at −40° C. |
| 1 | >1000 | 255 |
| 2 (R) | 20 | 15 |
| 3 (R) | 280 | 70 |
| 4 (R) | >1000 | 290 |

TABLE II

| | Imperviousness of the compositions | |
|---|---|---|
| Example no. | pure petrol | petrol/methanol mixture |
| 1 | 60 | 130 |
| 2 (R) | 60 | 70 |
| 4 (R) | — | 1350 |

TABLE III

| | Imperviousness of the multilayer flasks | |
|---|---|---|
| Example no. | pure petrol | petrol/methanol mixture |
| 1 | 9 | 300 |
| 2 (R) | 7 | 90 |
| 3 (R) | 230 | 2400 |
| 5 (R) | 3100 | 3000 |

We claim:

1. A coextruded multilayer composite, comprising:

a layer of a polyolefin;

a layer of an impact-reinforced impervious resin composition consisting essentially of a hydrolyzed copolymer of vinyl acetate and ethylene, and an elastomeric copolymer of ethylene and propylene which is modified by grafting an α,β-ethylenically unsaturated carboxylic acid as an additive in an amount effective for improving impact strength; and an intermediate layer of a polymeric adhesive bonding together the layer of a polyolefin and the layer of an impact-reinforced impervious resin composition.

2. The coextruded multilayer composite according to claim 1 wherein the modified elastomeric copolymers of ethylene and propylene comprise form 40 to 95 mol % of ethylene-derived monomer units, form 60 to 5 mol % of propylene-derived monomer units and from 0.1 to 1.5% by weight of monomer units derived from an α,β-ethylenically unsaturated carboxylic acid.

3. The coextruded multilayer composite according to claim 1, wherein the modified elastomeric copolymers of ethylene and propylene comprise from 45 to 85 mol % of ethylene-derived monomer units, from 55 to 15 mol % of propylene-derived monomer units and from 0.6 to 1.2% by weight of monomer units derived from and α,β-ethylenically unsaturated carboxylic acid.

4. The coextruded multilayer composite according to claim 1, wherein the elastomeric copolymers of ethylene and propylene are modified by grafting with maleic anhydride.

5. The coextruded multilayer composite according to claim 1, wherein the impervious resin compositions comprise form 5 to 35% by weight of modified elastomeric copolymers of ethylene and propylene.

6. The coextruded multilayer composite according to claim 5, wherein the impervious resin compositions comprise from 15 to 25% by weight of modified elastomeric copolymers of ethylene and propylene.

7. The coextruded multilayer composite according to claim 1 wherein they comprise three layers consisting of an outer layer of high density polyethylene, an intermediate layer of polymeric adhesive and an outer layer consisting of an impact-reinforced impervious resin composition.

8. The coextruded multilayer composite according to claim 1, wherein they comprise three layers consisting of an outer layer of polypropylene, an intermediate layer of polymeric adhesive and an outer layer consisting of an impact-reinforced impervious resin composition.

9. The coextruded multilayer composite according to claim 1, wherein they comprise essentially two outer layers of high density polyethylene, an internal layer consisting of an impact-reinforced impervious resin composition and two intermediate layers of polymeric adhesive.

10. In a process of manufacturing a fuel storage vessel the improvement comprising manufacturing said vessel from a coextruded multilayer composite according to claim 9.

* * * * *